United States Patent [19]
Shaffer

[11] 3,715,511
[45] Feb. 6, 1973

[54] TELEPHONE PULSING CIRCUIT

[75] Inventor: William E. Shaffer, Rochester, N.Y.

[73] Assignee: Stromberg-Carlson Corporation, Rochester, N.Y.

[22] Filed: Sept. 24, 1969

[21] Appl. No.: 860,646

[52] U.S. Cl. ..............................179/16 E, 179/16 AA
[51] Int. Cl. ...............................................H04g 1/36
[58] Field of Search ..179/16 E, 18 G, 18 EB, 18 HB, 179/18 F, 18 FA, 16 A, 16 AA; 320/1

[56] References Cited

UNITED STATES PATENTS

| | | | |
|---|---|---|---|
| 3,626,101 | 12/1971 | Fitzsimons et al | 179/16 F |
| 3,551,754 | 12/1970 | Shaffer | 179/18 FA |
| 3,187,105 | 6/1965 | Parry | 179/16 E |
| 3,168,622 | 2/1965 | Smee | 179/16 E |
| 2,938,955 | 5/1960 | Molnar | 179/16 E |
| 2,495,725 | 1/1950 | Horwitz | 179/16 E |
| 2,966,555 | 12/1960 | Bakker | 179/18 HB |
| 3,243,611 | 3/1966 | Johansson | 320/1 |

*Primary Examiner*—Ralph D. Blakeslee
*Assistant Examiner*—Randall P. Myers
*Attorney*—Charles C. Krawczyk

[57] ABSTRACT

An inductive control device, such as a relay, is connected in series with a direct current power source, across a pair of conductors adapted to be connected to a telephone line to function as a pulsing circuit. A control circuit monitors the current flow in the series circuit and actuates a switching circuit when the telephone loop is open circuited to momentarily disconnect the pulsing circuit from the conductors and connect a resistive circuit across the conductors.

12 Claims, 2 Drawing Figures

WILLIAM E. SHAFFER
INVENTOR.

BY Charles C. Krawczyk
ATTORNEYS

WILLIAM E. SHAFFER
INVENTOR.

BY Charles C. Krawczyk

ATTORNEYS

TELEPHONE PULSING CIRCUIT

BACKGROUND OF THE INVENTION

This invention relates to switching circuits in general, and more particularly to circuits responsive to telephone supervisory and control signals, such as dial pulses.

This application is an improvement over a copending application Ser. No. 860,209, now abandoned, filed for Charles A. Frumusa and William E. Shaffer and entitled "Pulsing Circuit" filed on the same day as the present application and is assigned to the assignee of the present application.

In recent years there has been an increased emphasis on the use of more sensitive and faster responding control devices in telephone systems to provide improved service. For example, saturable reactors and lower inertia and faster responding pulsing relays are presently being applied to circuits for control by telephone supervisory and control signals. However, such sensitive control devices, under various conditions, tend to produce distorted output pulses that at times exceed acceptable limits, and in the case of relays, tend to produce undesirable spurious or additional contact closures.

Telephone systems generally employ pulsing circuits that can be connected to any one of a large number of subscriber telephone lines. Each telephone line generally presents a different electrical characteristic depending upon its length, gauge, leakage, connected telephone set, etc. Each telephone line, therefore, presents a different value of capacitance, inductance and resistance between the subscriber's dial and the associated pulsing circuit so that the operating conditions of the pulsing circuit change with each telephone line connection. Furthermore, due to the high cost of copper, there is a general tendency to use smaller diameter conductors to reduce costs. However, the telephone lines including the smaller conductors exhibit a higher resistance per unit length, and may at times exhibit higher capacitance per unit length. Therefore, the length of such telephone lines becomes an increasingly important factor in determining the electrical characteristics of the telephone loop.

The change in operating conditions between different line connections is particularly noticeable in central offices wherein higher supply voltages are used to assure that the required amount of line current flows through high resistance long line connections. The higher potentials and the various reactive components in the telephone loop tend to interact to apply distorted current pulses through the control device resulting in improper circuit operation, and in the case of pulsing relays, enhance the conditions under which undesirable spurious contact closures are generated.

Normally in the standard step-by-step switching system such distorted current pulses (within limits) and such spurious contact closures (within limits) generally do not create a problem, since the inertia of the step-by-step switching devices is sufficiently high that the distorted pulses and spurious contact closures do not seriously affect the operation of the system. However, in electronic switching systems and step-by-step systems modified to include electronic switching circuits, the response time may be such that the circuit will incorrectly respond to the distroted current pulses and/or spurious contact closures and result in erroneous switching.

In addition to the foregoing, the components in usual telephone ringer circuits are designed for proper operation when connected to a central office battery having a standard range of output potentials. With the standard range of potentials, the current flow through a telephone ringer circuit due to the charge and discharge of capacitive elements in the telephone circuit during dialing, is generally insufficient to overcome the inertia and spring bias of the ringer to cause the ringer to audibly tap. The amount of transient current flow through the ringer during dialing is proportional to the magnitude of the central office power supply voltage. Therefore, in central offices wherein the voltage of the central office batteries has been substantially increased over that of the usual range of battery voltage (to assure the required amount of line current in high resistance line connections) the conditions under which the ringer taps when the subscriber dials are enhanced and often reaches a value sufficient to overcome the inertia and spring bias of the ringer to cause the ringer to audibly tap. This type of ringer tap is generally annoying to the subscriber.

The circuit of the invention overcomes the disadvantages of the prior art by reducing the effects of the reactive components in telephone lines and sets on the switching response of pulsing circuits, and also significantly reduces the occurrence of ringer tap.

It is therefore an object of this invention to provide a new and improved pulsing circuit that reduces the likelihood of ringer tap in a connected subscriber telephone during dialing.

It is also another object of this invention to reduce the effect of the capacitive and inductive components on the switching response of a pulsing circuit.

It is another object of this invention to provide a new and improved pulsing circuit that can be used with short and long telephone lines and provide accurate pulsing.

It is also an object of this invention to provide a new and improved circuit which reduces ringer tap and pulse distortion.

BRIEF DESCRIPTION OF THE INVENTION

An inductive control device (such as a relay) is connected in a direct current series circuit between a direct current power source and a pair of conductors adapted to be connected through a telephone line to a telephone set, so that the control device is activated when the connected telephone set is in an "off hook" condition. A control circuit is connected to the control device to develop a momentary control signal, having a time duration in the order of the open circuit portion of dial pulses, when the telephone loop is open circuited. The control signal is applied to a switching means (such as a relay) having a plurality of switching circuits that are rendered conductive and non-conductive by the control signal applied to the switching means. One of the switching circuits is connected in the series circuit to disconnect the power source from the telephone line during the presence of the control signal. Another of the switching circuits connects a discharge circuit across the pair of conductors during the presence of the control signal to discharge the charges stored in the connected telephone line and set. The removal of the power source and the connection of the discharge circuit minimizes the stored charges in the vicinity of the telephone set and thereby reduces ringer tap. Furthermore, the disconnection of the control device from the telephone line and set enhances the collapse of the magnetic flux therein and therefore allows the control device to more accurately follow the dial pulses.

A further feature of the invention provides for a circuit for determining when the connected telephone set is subsequently close circuited to cut short the duration of the control signal.

DESCRIPTION OF THE PREFERRED EMBODIMENT

Figure 1:
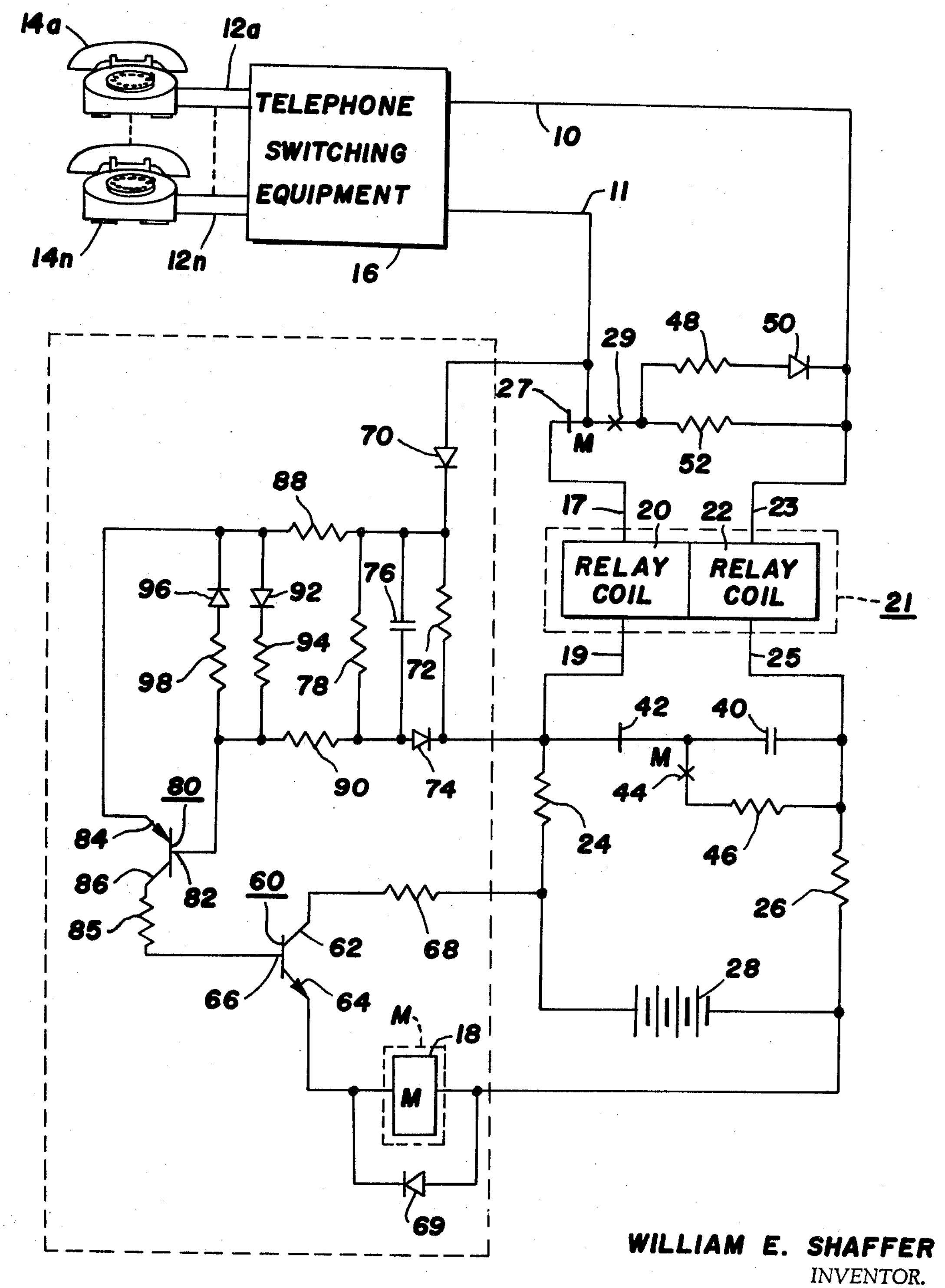

A relay pulsing circuit of FIG. 1 is connected to a pair of central office conductors 10 and 11 generally designated as the tip and ring conductors, or a transmit pair. The relay circuit may, for example, be a portion of a selector circuit or a connector circuit in a step-by-step system, or a portion of a register circuit or junctor circuit in a common control system. The central office conductors 10 and 11 are adapted to be connected to any one of a large number of subscriber telephone lines 12*a*–12 and to their connected telephone sets 14*a*–14 through a switching equipment 16 that can be any of the above mentioned telephone switching circuits.

The telephone lines 12*a*–12*n* of FIG. 1 can be terminated by the telephone sets 14*a*–14*n* of the type fully described in an article entitled "An Improved Circuit for the Telephone Set" by A.F. Bennett in "The Bell System Technical Journal," May 1953, Pages 611–625. The telephone set includes an alternating current ringer circuit for connection across a telephone line. The ringer circuit generally includes a ringer coil in series with a capacitor. The telephone dial includes contacts that alternately apply and remove a direct current circuit across the telephone line and ringer circuit at a predetermined rate to produce dial pulses having a preset time duration (within specified standard limits). In effect, during dialing alternate open and closed circuit conditions are exhibited across the connected telephone line and the conductors 10 and 11.

These alternate open and closed circuit conditions tend to cause the capacitive elements in the telephone circuit to be charged and discharged at the dial pulse rate through various paths including the ringer circuit. The current flow through the ringer circuit due to the charging and discharging of the capacitive elements may at times be enough to overcome the inertia and spring bias of the ringer to a sufficient degree to audibly tap the ringer. Generally, the transient surge of current through the ringer due to the discharge of the capacitive elements was found to have a higher instantaneous amplitude and therefore most troublesome. The ringer tap due to the discharge current was eliminated in the prior art by spring biasing the clapper of the ringer against the bell and by connecting the ringer in a manner so that the discharge current would be in a direction to keep the clapper against the bell.

However, when the battery voltage in the central offices is increased to assure sufficient telephone transmitter current in high resistance line connections, the ringer tap due to the charge current became more predominant than with the lower battery voltages. The use of a higher potential in the central office batteries results in a higher surge of charging current and thereby increases the tendency for producing ringer tap.

Furthermore, the reactive components in the telephone set and the telephone line and pulsing circuit tend to react in a manner to distort the current pulses applied to the pulsing control device from that of the operation of the dial contacts. Hence, the response of the control device to the distorted current pulses may result in generating output pulses that do not conform to the dial pulses, such as for example, by extending or shortening the time duration of the pulses. Furthermore, any oscillatory condition in the current pulse through the control device may result in a greater number of pulses, or spurious or added contact closures in the case of relays.

In the copending applications Ser. No. 860,375, now U.S. Pat. No. 3,676,601, and Ser. No. 860,645, now U.S. Pat. No. 3,665,109, for William E. Shaffer, entitled "Pulsing Circuit Including a Series Switching Circuit" and "Pulsing Circuit Including a Switching and Current Regulator Circuit," respectively, filed on the same day as the present application, the power source for the telephone loop is disconnected from the connected telephone line and set during the open circuit portion of the dial pulses and thereby reduces the effect of the reactive components on the operation of the pulsing device and also reduces the charge that can be accumulated on the capacitive elements of the telephone loop during the open circuit portion of dial pulses. The circuit of FIG. 1 of the present invention not only disconnects the power source from the telephone line and set during the open circuit portion of the dial pulses, but also applies a discharge path across the telephone line during the same period to further reduce the charge that may have accumulated in the capacitive component in the telephone set and distributed capacitive elements in the telephone line.

In FIG. 1, one lead 17 of the coil 20 of the relay 21 is connected through normally closed contacts 27 of relay M to the conductor 11 while the other lead 19 is connected through a current limiting resistor 24 to the positive terminal of the direct current power source 28. One lead 23 of the relay coil 22 is connected to the conductor 10 while the other lead 25 is connected through a current limiting resistor 26 to the negative terminal of the power source 28. The relay coils 20 and 22 are flux-aiding coils of the pulsing relay 21. The relay contacts 27, the relay coils 20 and 22 and the resistors 24 and 26 define a direct current series pulsing circuit that is adapted to be connected to a telephone set (14a-14n) via conductors 10 and 11, the telephone switching equipment 16 and telephone lines 12*a*–12*n*.

When a closed circuit condition is exhibited across the conductors 10 and 11 (such as an "off hook" condition, or during the closed circuit portion of the dial pulses in a connected telephone) the direct current series circuit (including the relay coils 20 and 22) and a connected telephone (14*a*–14*n*) are energized by the power source 28. The resistors 24 and 26 function to limit the amount of current flow in the telephone loop so that the pulsing circuit can be connected to telephone sets through low and high resistance telephone lines. Although the circuit of FIG. 1 includes two relay coils 20 and 22 in a balanced configuration, it is to be understood that a single relay coil could also be used in an unbalanced configuration.

A capacitor 40 is connected through normally closed contacts 42 of relay M across the series circuit between leads 19 and 25. A resistor 46 is connected across the capacitor 40 through normally open contacts 44 of relay M. A discharge circuit including a resistor 52 in parallel with a series circuit including a resistor 48 and a diode 50 is connected across the conductors 10 and 11 through normally open contacts 29 of relay M.

A control circuit (within the dashed lines 67) is coupled across the portion of the series circuit including the normally closed contacts 27 and the relay coil 20, to actuate the relay M for a controlled period of time after the telephone loop is open circuited. The relay M is energized by a transistor 60 wherein the collector 62, the emitter 64 and a coil 18 of relay M are connected in series with a resistor 68 and across the power source 28. A diode 69 is connected across a relay coil 18 to reduce transient voltage spikes.

A signal for controlling actuation of the relay M is developed by a pair of diodes 70 and 74 connected between the conductor 11 and the lead 19, and a capacitor 76, to momentarily charge the capacitor when the telephone loop is open circuited. The capacitor 76 is shunted by a resistor 78 and is connected across the base 82 and emitter 84 of a transistor 80 through the current limiting resistors 88 and 90. The collector 86 of the transistor 80 is connected through a resistor 85 to the base 66 of the transistor 60. A pair of voltage limiting circuits, including the diodes 92 and 96 connected in series with the resistors 94, 98 respectively, are connected across the base 82 and the emitter 84 of the transistor 80.

In operation, when the telephone loop is closed circuited, (a connected telephone set exhibits a closed circuit condition across the conductors 10 and 11, such as an "off hook" condition in a connected telephone set, or during the closed circuit portion of the dial pulses) a current supplied by the source 28 energizes the relay coils 20 and 22 and actuates the relay 21. The polarity of the voltage drop across the relay coil 20 is in a direction to reverse bias the diodes 70 and 74. When the telephone loop is subsequently open circuited (the load across the conductors 10 and 11 changes from a closed circuit condition to an open circuit condition, such as during the open circuit portion of the dial pulses) the polarity of the potential across the relay coil 20 reverses to forward bias the diodes 70 and 74, and charge the capacitor 76 in a direction to forward bias the transistor 80. When the transistor 80 conducts, the transistor 60 is rendered conductive and actuates the relay M. The time constant of the discharge circuit for the capacitor 76 is selected so that the transistors 60 and 80 are momentarily conductive for a period of time slightly less than the duration of the minimum specified standard time duration for the open circuit portion of the dial pulses.

When the relay M is energized, the contacts 27 open and effectively disconnects the power source 28 from the conductors 10 and 11. Hence, during such period, the capacitive elements in the vicinity of the telephone ringer are not charged. In addition, the contacts 29 are closed to connect a discharge circuit including the resistors 48 and 52 and the diode 50 across the conductors 10 and 11 to discharge the stored charges in capacitive elements in the telephone line and the connected telephone set. Hence, since the circuit between the power source and the capacitive elements is opened, the amount of charge that can be stored in the capacitive elements is limited to that accumulated during the closed loop condition, and since a discharge path is connected across the conductors, the accumulated charge is reduced, and accordingly the conditions for creating ringer tap have been essentially eliminated.

The components comprising the discharge path for the capacitor 76 are selected so that the transistors 60 and 80 are conductive for a period of time less than the minimum time duration of the open circuit portion of the dial pulses and become nonconductive (so that the relay M is deactivated) before the end of the open circuit portion of the dial pulses. The capacitor 40 functions as a delay circuit to delay the charge that can be accumulated on the capacitive components in a connected telephone set during that portion of the open circuit dial pulses when the relay M is deactivated. When the relay M is first actuated, the contacts 42 open and the contacts 44 close so that the resistor 46 is connected across the capacitor 40 to discharge the capacitor. When the relay M is subsequently deactivated, the discharged capacitor 40 is connected across the lines 19 and 25 and thereby delays the potential applied to the lines 10 and 11 in accordance with the charging time of the capacitor 40. It should be noted, that if the charge accumulated on the capacitors, in the vicinity of the telephone sets, during that portion of the open circuit portion of the dial pulses when a relay 18 is deactivated presents no ringer tap problem, the capacitor 40, and the resistor 46 can be eliminated.

The control circuit 67 functions as a switching circuit to detect when the telephone loop is open circuited to remove the power source 28 from the conductors 10 and 11 for a period of time slightly less than the open circuit portion of the dial pulses and also applies a discharge path across the conductors 10 and 11. The circuit of FIG. 1 thereby provides a means for reducing the magnitude of the charge that can be stored in the capacitive components of the telephone loop during this period. The circuit of FIG. 1 also reduces the effect of the reactive components on the circuit in the operation of the pulsing relay 21. As previously mentioned above, when the telephone loop is open circuited (i.e. the load across the conductors 10 and 11 is changed from a closed circuit condition to an open circuit condition) the transistor 60 and 80 are rendered conductive and the relay 18 is actuated. When relay M is actuated, the normally closed contacts 27 are opened to disconnect the relay coils 20 and 22 from the remaining portion of the circuit (the telephone ringer circuit and the distributed inductive, resistance, and capacitive units of the telephone line) and decrease the time required to collapse the magnetic flux in the relay coils 20 and 22, isolate the relay coils 20 and 22 from any oscillatory decay current condition in the line, and thereby enable the operation of the relay 21 to more closely follow the dial pulses, and reduces the likelihood of undesirable spurious contact closures.

Figure 2:
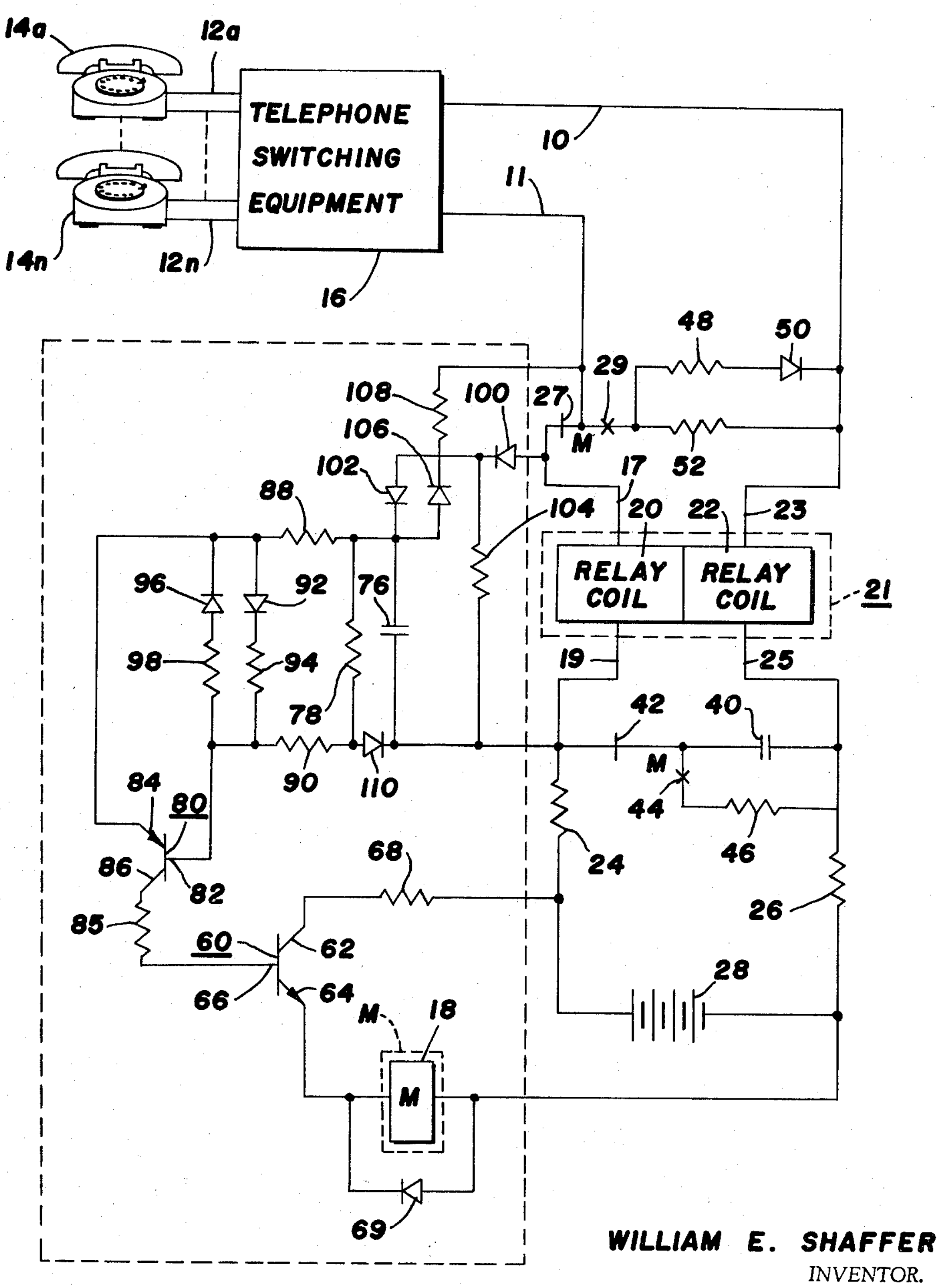

The circuit of FIG. 2 includes a circuit for discharging the capacitor 76 in the event the relay M may still be actuated at the time the connected telephone loop is switched from an open circuit to a closed circuit condition. The same reference numerals have been used to designate corresponding elements in FIGS. 1 and 2 to maintain a correspondence between the respective circuits, thereby facilitating a ready understanding of the circuits.

A pair of diodes 100 and 102 are connected in series between the lead 17 and the capacitor 76 and function to charge the capacitor 76 when the telephone loop is open circuited (instead of the diodes 70 and 74 of FIG. 1). A resistor 104 is connected between the junction of the diodes 100 and 102 and the lead 19. A diode 110 is connected between the resistor 90 and the capacitor 76 to block current flow therethrough except when the capacitor 76 is discharging. A series circuit including a diode 106 and a resistor 108 is connected between the conductor 11 and the capacitor 76 to provide a discharge path for the capacitor in the event the relay M is activated when a closed circuit condition is applied across the conductors 11 and 10.

In operation, when a connected telephone is "off hook" the relay 21 is energized in the same manner as set forth with regards to FIG. 1. When the direct current circuit of the telephone loop is subsequently open circuited, such as during dialing, the reverse polarity developed across the relay 20 forward biases the diode 100 and 102 to charge the capacitor 76 in a direction to forward bias the transistor 80 thereby rendering the transistor 60 conductive and actuating the relay M. The transistors 60 and 80 will remain conductive until the charge across the capacitor 76 is discharged to a point that the transistors 80 and 60 will no longer be conductive sufficiently to maintain the relay M actuated. In the event that the connected telephone should apply a closed circuit condition across the conductors 10 and 11 before the relay M is deactivated, a discharge path is provided for the capacitor 76 through the diode 106 and the resistor 108 thereby enhancing the discharge of the capacitor 76 to a point that the relay M will quickly be deactivated. The circuit of FIG. 2 has the advantage of providing a greater degree of freedom in selecting the components in the circuit since the discharge time of the capacitor 76 is not as critical.

I claim:

1. A telephone pulsing circuit comprising:

a pair of input terminals adapted for connection through switching equipment and a telephone line to a telephone set;

a pair of power terminals adapted for connection to a direct current power source;

a control device responsive to direct current flow therethrough for actuation thereof;

circuit means connecting said control device in a direct current series circuit between said input terminals and said power terminals wherein the series circuit, a path through the switching equipment, a telephone line and a telephone set define a direct current telephone loop connection and wherein said control device is actuated when a connected telephone set is off hook, and circuit means, including a timing circuit, coupled to said series circuit for detecting when said telephone loop connection is switched from a closed circuit condition to an open circuit condition, disconnecting said series circuit from said pair of input terminals and simultaneously connecting a direct current circuit across said input terminals, wherein said direct current circuit is applied across the portion of the telephone loop including a path through the switching equipment, a telephone line and a telephone set, for a time duration on the order of the period of the open circuit portion of telephone dial pulses.

2. In a telephone system including an exchange having switching equipment, a pulsing circuit, a plurality of subscriber telephone sets, a telephone line individually connecting each of said telephone sets to the switching equipment so that individual ones of said telephone lines can be selected, and a direct current power source, said pulsing circuit comprising:

a pair of conductors for connection to said switching equipment;

an inductive control device responsive to be actuated by a direct current flow therethrough;

switching means including a plurality of switching circuits, said switching means being responsive to a control signal for rendering said switching circuits conductive and non-conductive;

circuit means connecting said control device in a direct current series circuit with a first one of said switching circuits, between said pair of conductors and said power source, wherein said series circuit, a path through the switching equipment and a connected telephone line and set define a direct current telephone loop connection, and wherein said control device is actuated by a closed circuit condition in a connected telephone set;

control circuit means coupled to said series circuit and said switching means for detecting when said telephone loop is switched from a closed to an open circuit condition for momentarily applying a control signal to said switching means to momentarily open said first one of said switching circuits, and a direct current discharge circuit connected through a second one of said switching circuits across said pair of conductors so that when said control signal is applied to said switching means said discharge circuit is connected across said pair of conductors and wherein said discharge circuit is applied across the portion of the telephone loop connection including a path through the switching equipment, a telephone line and a telephone set.

3. A pulsing circuit as defined in claim 2 wherein:

said switching means comprises a relay;

said first switching circuit connected in said direct current series circuit comprises normally closed contacts of said relay, and said second switching circuit connecting said discharge circuit to said pair of conductors comprises normally open contacts of said relay.

4. A pulsing circuit as defined in claim 3 wherein:

said control device comprises a relay, and said discharge circuit comprises a direct current circuit including a resistor.

5. A relay pulsing circuit comprising;

a pair of conductors for connection to a switching circuit that connects and disconnects a direct current circuit across said pair of conductors;

a pair of power terminals for connection to a direct current power source;

first and second relays each including a coil;

circuit means connecting the coil of said first relay in a direct current series circuit with normally closed contacts of said second relay between said power terminals and said pair of conductors;

direct current discharge circuit means connected in series with normally open contacts of said second relay across said pair of conductors;

capacitive means;

rectifying circuit means coupled to a portion of said series circuit including at least said first relay coil, and coupled to said capacitive means, responsive to a signal generated across said first relay coil when said switching circuit switches from a closed to an open circuit load, for applying a charge to said capacitive means, and circuit means connected to said capacitive means and said second relay coil for momentarily energizing said second relay coil in response to said charge on said capacitive means.

6. A relay pulsing circuit as defined in claim 5 including a discharge circuit for said capacitive means for controlling the time duration said second relay is energized.

7. A relay pulsing circuit as defined in claim 6 including circuit means coupled between a conductor and said capacitive means for discharging said capacitive means when said switching circuit changes from an open circuit load to a closed circuit load.

8. A relay pulsing circuit as defined in claim 7 wherein said direct current discharge circuit includes a resistive element in series with a diode.

9. In a telephone system including an exchange having switching equipment, a pulsing circuit, a plurality of subscriber telephone sets, a telephone line individually connecting each telephone set to the switching equipment for selecting individual ones of said telephone sets, and a direct current power source, said pulsing circuit comprising:

a pair of conductors for connection to said switching equipment;

first and second relays, each of said relays having at least one coil;

circuit means connecting at least one coil of said first relay in a direct current series circuit through normally closed circuits of said second relay between said direct current power source and said pair of conductors, wherein the series circuit and the connected telephone line and set define a telephone loop connection, and wherein said first relay is actuated by a closed circuit direct current connection in a connected telephone set;

a resistive discharge circuit connected across said pair of conductors through normally open contacts of said second relay;

capacitive means;

circuit means connected across a portion of said series circuit including at least said one coil of said first relay and connected to said capacitive means for applying a charge to said capacitive means when a connected telephone set is switched from a closed to an open direct current condition;

circuit means responsive to the charge across said capacitive means for actuating said second relay, and a discharge circuit for said capacitive means for controlling the time duration said second relay is actuated.

10. A pulsing circuit as defined in claim 9 wherein the discharge circuit for said capacitive means discharges said capacitive means so that said second relay is energized and subsequently de-energized within a period of time on the order of the open circuit portion of telephone dial pulses.

11. A pulsing circuit as defined in claim 9 wherein:

said circuit means for applying a charge to said capacitive means comprises a rectifying circuit, and including a discharge circuit connected between said capacitive means and one of said pair of conductors providing a second discharge circuit for said capacitive means when second relay is actuated and a connected telephone set is switched from an open circuit condition to a closed circuit condition.

12. In a telephone system including an exchange having switching equipment, a pulsing circuit, a plurality of subscriber telephone sets, a plurality of telephone lines individually connecting at least one of the plurality of telephone sets to the switching equipment, and a direct current power supply, wherein a path through the switching equipment, the power supply, the pulsing circuit, a telephone line and a telephone set define a direct current telephone loop connection, said pulsing circuit comprising:

a pair of input terminals for connection to said switching equipment;

a pair of power terminals for connection to said power source;

a control device responsive to direct current flow therethrough for actuation thereof;

circuit means connecting said control device in a direct current series circuit between said input terminals and said power terminals for connection by said switching equipment in a telephone loop connection so that said control device is actuated when a connected telephone set exhibits an off hook condition, and circuit means, including a timing circuit, coupled to said series circuit for detecting the interruption of current flow therethrough for disconnecting said series circuit from said pair of input terminals and simultaneously connecting a direct current circuit across said input terminals, wherein said direct current circuit is applied across the portion of the telephone loop including the path through the switching equipment, a telephone line and a telephone set, for a time duration on the order of the period of the open circuit portion of telephone dial pulses.

* * * * *

UNITED STATES PATENT OFFICE

CERTIFICATE OF CORRECTION

PATENT NO. : 3,715,511

DATED : February 6, 1973

INVENTOR(S) : William E. Shaffer

It is certified that error appears in the above-identified patent and that said Letters Patent are hereby corrected as shown below:

Col. 3, line 26 — "12a-12" should read ---12a-12n---.

Col. 3, line 27 — "14a-14" should read ---14a-14n---.

Signed and Sealed this

*second* Day of *December 1975*

[SEAL]

*Attest:*

RUTH C. MASON
*Attesting Officer*

C. MARSHALL DANN
*Commissioner of Patents and Trademarks*